Jan. 17, 1928.
H. H. STRONG
1,656,247
ARC REGULATOR
Filed Jan. 18, 1926
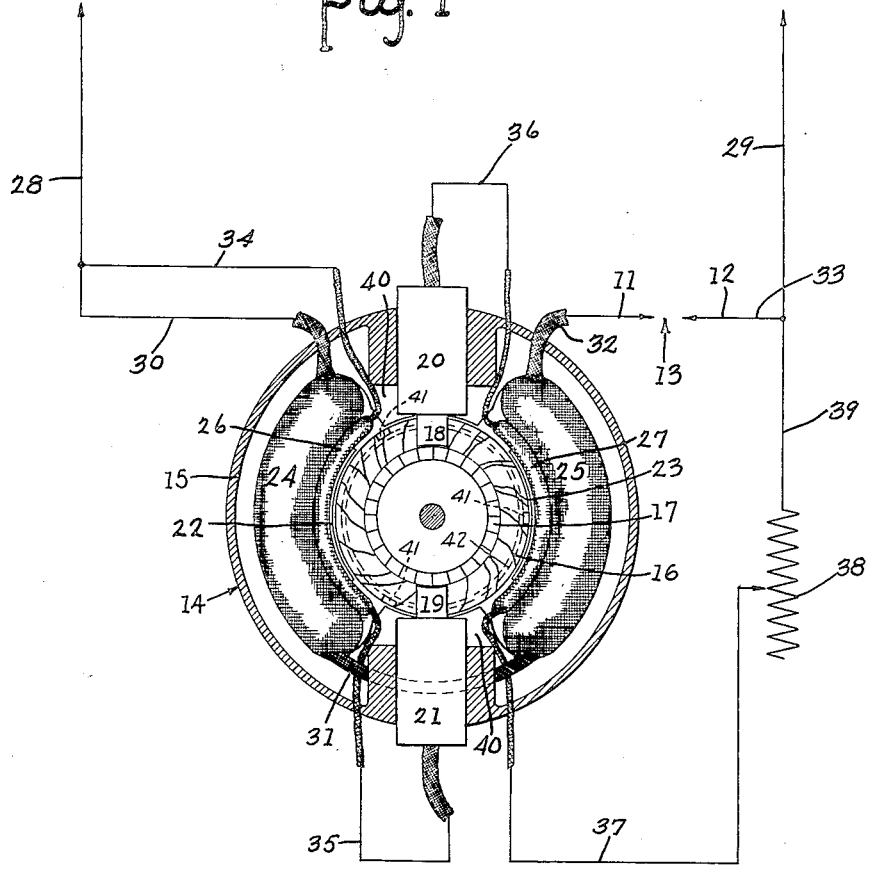
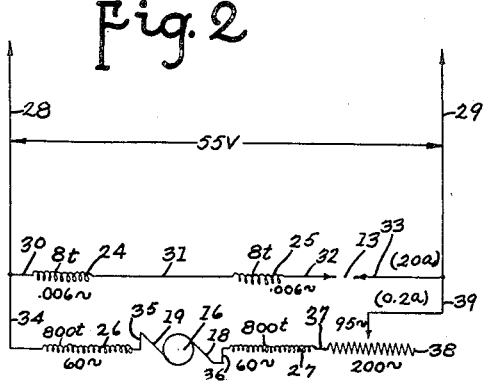
Harry H. Strong
Inventor
by Smith and Freeman
Attorneys Patented Jan. 17, 1928.

1,656,247

UNITED STATES PATENT OFFICE.

HARRY H. STRONG, OF TOLEDO, OHIO.

ARC REGULATOR.

Application filed January 18, 1926. Serial No. 82,077.

My invention relates to arc regulators and the principal object of my invention is to provide an improved arc regulator particularly adapted for effecting and regulating the feed of the electrodes of the arc of a motion picture projector. In the drawings accompanying this specification and forming a part thereof I have shown, for purposes of illustration, one form which my invention may assume. In these drawings:

Figure 1 is a view illustrating the motor employed to feed the electrodes according to the form of my invention illustrated, and showing also the connections of the motor into the circuit, while Figure 2 is a diagrammatic view showing the electrical arrangement of all of the parts.

According to the embodiment of my invention shown herein the electrodes 11 and 12 of the arc 13 are advanced and retracted through any suitable mechanism (not shown) by means of an electric motor 14 provided with a frame 15 rotatably supporting an armature 16 provided with a commutator 17 contacted by brushes 18 and 19 carried by brush holders 20 and 21 supported by the frame 15 as shown. The frame 15 also supports a pair of active field poles 22 and 23 arranged to form a magnetic field for the armature 16 and provided with first field coils 26 and 27 arranged to set up a magnetic flux in one direction and opposing field coils 24 and 25 arranged to set up a magnetic flux in the reverse direction.

In the embodiment of my invention herein shown there are two parallel circuits between the line wire 28 and the line wire 29, the first consisting of the lead 30, the opposing field coil 24, the connecting conductor 31, the opposing field coil 25, the lead 32, the arc 13, and the lead 33, and the second consisting of the lead 34, the first field coil 26, the lead 35, the brush 19, the armature 16, the brush 18, the lead 36, the first field coil 27, the lead 37, the variable resistor 38, and the lead 39.

With these connections it will be obvious that of the two opposing fields the opposing field is connected in series with the arc and is therefore of a strength proportionate to the current flowing through the arc, and the first field is connected across the arc and is therefore of a strength proportionate to the voltage drop across the arc. It is of course well known that as the electrodes separate the voltage drop across the arc increases and the current decreases, and that the reverse occurs when the electrodes approach, and therefore it will readily be understood that with the proper adjustment in strength between the two fields the decrease in current and increase in voltage drop as the electrodes separate will cause the first field to predominate over the opposing field and the resultant field to be in one direction while the increase in current and decrease in voltage as the electrodes approach will cause the opposing field to predominate over the first field and the resultant field to be in the reverse direction.

Inasmuch as the armature is always energized in the same direction the change in direction of the resultant field will obviously change the direction of rotation of the motor and accordingly, with the proper connections between the motor and the electrode feeding mechanism, the predominance of the first field as the electrodes separate will cause the motor to operate in a direction to advance the electrodes, and the predominance of the opposing field as the electrodes approach too closely will cause the motor to operate in the reverse direction to separate the electrodes.

Under normal motor conditions, however, the speed of rotation of the motor armature varies inversely as the strength of the field, and accordingly, with normal motor conditions, the armature 16 would rotate with increasing speed as the electrodes approach the proper spacing and the resultant field approaches zero and would then tend to rotate at maximum speed in the reverse direction as soon as the resultant field has changed polarity. In order to eliminate this undesirable action I form the armature circuit, the first field coils 26 and 27, the armature 16, and the resistor 38, of unusually high resistance to make the resistance drop in this circuit at normal current almost equal to line voltage and to correspondingly reduce the counter-electro-motive-force drop across the armature 16 to a negligible value at all speeds at which the motor operates. Under these conditions, the variation in counter electro-motive-force drop upon variation in the field strength or in the speed of the motor is negligible and the current flowing through the armature curcuit is substantially unaffected by the change in counter-electro-motive-force drop and therefore remains substantially constant at all times. Accordingly, under these conditions the tendency of the motor to speed up in response to field weakening is not only substantially eliminated but, because of the constant current in the armature, the motor actually operates faster upon increase in field strength because of the increase in torque resulting from the fact that with the current constant in the armature the torque is directly proportional to the field strength.

I accordingly produce a condition wherein the motor speed decreases with decrease in field strength through a zero speed at the point of zero field strength and then increases in speed in the reverse direction as the resultant field increases in strength also in the reverse direction.

Obviously with the parts properly proportioned the two fields will exactly balance at that point at which the electrodes are properly spaced to secure the desired arc, and the motor will maintain the electrodes so spaced at all times during the operation of the arc.

In actual practice, however, there seems to be a limit to the motor speed at which this counter-electro-motive-force drop remains negligible. Under normal conditions the speed of the motor may be held below this critical speed by the load of the electrode operating mechanism but I nevertheless find it desirable to construct the motor to inherently remain below this critical speed, accomplishing this in any desired manner but preferably by embodying in the motor winding a fragmentary squirrel-cage armature formed of the proper strength to produce at the critical speed the drag necessary to prevent increase of the motor speed beyond the critical value and herein shown as comprising three bars 41 connected at their ends by short-circuiting rings 42.

On the other hand, I have found that with a motor constructed as above described a very undesirable action will occur during the reversal in direction of the resultant field because of the action of the field set up by the armature winding and abnormally strong relative to the main field during the period of weak main field incident to the reversal in direction of the main field. In order to eliminate this undesirable action I provide the motor herein shown with an additional set of poles 40 interspersed one between each of the active field poles, the poles 22 and 23 herein, and accordingly at all times in alinement with the armature field and therefore in position to complete a path for the armature field which will extend outwardly through one of these extra poles 40 to the motor frame 15, divide and pass around the frame 15 half on each side to the opposite extra pole 40, and then pass inwardly through this extra pole 40 back to the armature 16, ineffective to in any way affect the main motor field.

In the present disclosure I have of course shown only one pair of active poles and accordingly only two of the extra poles 40 but it will be understood that with two pair of active poles I would provide four of the extra poles 40 and also that I would provide these extra poles 40 between each active pole regardless of whether or not each active pole is wound, in other words, that with a four pole machine having the two opposite poles wound north and the poles at right angles unwound but south because of the windings on the two north poles, I would still insert four of the extra poles one between each north and south pole.

A regulator of the type herein shown is particularly designed to operate under conditions where the arc is connected substantially directly across a line of substantially proper voltage for the arc, and accordingly, inasmuch as practically all motion picture arcs operate at substantially the same voltage, a regulator of the type herein shown is likely to be operated on the same voltage regardless of where it may be installed. At the same time, however, some variation in operating voltages is encountered and in order to compensate for this it is desirable to provide in the arc regulator some means of adjustment. I therefore find it desirable to form part of the resistance of the armature circuit as the resistor 38 and to form this resistor variable to provide the adjustment necessary for any variation in line voltage which may be encountered.

Among other values which I find suitable in the form of my invention herein shown are those shown in Figure 2 wherein the regulator is arranged to operate on a 55 volt line with an arc requiring twenty amperes, each opposing field coil is provided with eight turns and has a resistance of .006 ohms, each first field coil consists of 800 turns with a resistance of sixty ohms, the armature has a resistance of sixty ohms, the resistor 38 contains a total resistance of 200 ohms of which 95 ohms is connected in the circuit.

Of course it will be obvious to those skilled in the art that the form of my invention herein shown may be operated with different proportions under the conditions herein set forth and will necessarily require different proportions under different operating conditions such as different line voltage or different arc amperage, and also that the form of my invention herein shown and described may be widely changed and modified without departing from the spirit of my invention or sacrificing the advantages thereof.

It will therefore be understood that the disclosure herein is illustrative only and that my invention is not limited thereto.

I claim:

1. Arc electrode feeding means comprising a motor having a first field connected in parallel with the gap, an opposing field connected in series with the gap, and an armature coacting with the resultant of said fields, connected in a circuit the admittance of which is relatively unaffected by variation in speed of said armature over the range of operating speeds of said armature, and arranged to operate the electrodes of said gap to cause relative approachment of said electrodes when said first field predominates and relative recession of said electrodes when said opposing field predominates.

2. Arc electrode feeding means comprising a motor having a first field connected in parallel with the gap, an opposing field connected in series with the gap, and an armature coacting with the resultant of said fields, connected in a circuit which is of sufficiently high resistance to substantially eliminate the effect of the armature counter-electro-motive-force, and arranged to operate the electrodes of said gap to cause relative approachment of said electrodes when said first field predominates and relative recession of said electrodes when said opposing field predominates.

3. Arc electrode feeding means comprising a motor having a first field connected in parallel with the gap, an opposing field connected in series with the gap, and an armature coacting with the resultant of said fields, connected in series with said first field in a circuit which, including the resistance of said armature and of said first field, is of sufficiently high resistance to substantially eliminate the effect of the armature counter-electro-motive-force, and arranged to operate the electrodes of said gap to cause relative approachment of said electrodes when said first field predominates and relative recession of said electrodes when said opposing field predominates.

4. Arc electrode feeding means comprising a motor having a first field connected in parallel with the gap, an opposing field connected in series with the gap, and a high-resistance armature coacting with the resultant of said fields, connected in a circuit which is of sufficiently high resistance to substantially eliminate the effect of the armature counter-electro-motive-force, and arranged to operate the electrodes of said gap to cause relative approachment of said electrodes when said first field predominates and relative recession of said electrodes when said opposing field predominates.

5. Arc electrode feeding means comprising a motor having a first field connected in parallel with the gap, an opposing field connected in series with the gap, and an armature coacting with the resultant of said fields, connected in series with an external resistor in a circuit which, including the resistance of said armature and of said resistor, is of sufficiently high resistance to substantially eliminate the effect of the armature counter-electro-motive-force, and arranged to operate the electrodes of said gap to cause relative approachment of said electrodes when said first field predominates and relative recession of said electrodes when said opposing field predominates.

6. Arc electrode feeding means comprising a motor having a first field connected in parallel with the gap, an opposing field connected in series with the gap, and a high-resistance armature coacting with the resultant of said fields, connected in series with said first field and in a circuit which, including the resistance of said armature and of said first field, is of sufficiently high resistance to substantially eliminate the effect of the armature counter-electro-motive-force, and arranged to operate the electrodes of said gap to cause relative approachment of said electrodes when said first field predominates and relative recession of said electrodes when said opposing field predominates.

7. Arc electrode feeding means comprising a motor having a first field connected in parallel with the gap, an opposing field connected in series with the gap, and an armature coacting with the resultant of said fields, connected in series with said first field and with an external resistor in a circuit which, including the resistance of said armature and of said first field and of said resistor, is of sufficiently high resistance to substantially eliminate the effect of the armature counter-electro-motive-force, and arranged to operate the electrodes of said gap to cause relative approachment of said electrodes when said first field predominates and relative recession of said electrodes when said opposing field predominates.

8. Arc electrode feeding means comprising a motor having a first field connected in parallel with the gap, an opposing field connected in series with the gap, and a high-resistance armature coacting with the resultant of said fields, connected in series with an external resistor in a circuit which, including the resistance of said armature and of said resistor, is of sufficiently high resistance to substantially eliminate the effect of the armature counter-electro-motive-force, and arranged to operate the electrodes of said gap to cause relative approachment of said electrodes when said first field predominates and relative recession of said electrodes when said opposing field predominates.

9. Arc electrode feeding means comprising a motor having a first field connected in parallel with the gap, an opposing field connected in series with the gap, and a high-resistance armature coacting with the resultant of said fields, connected in series with said first field and with an external resistor in a circuit which, including the resistance of said armature and of said first field and of said resistor, is of sufficiently high resistance to substantially eliminate the effect of the armature counter-electro-motive-force, and arranged to operate the electrodes of said gap to cause relative approachment of said electrodes when said first field predominates and relative recession of said electrodes when said opposing field predominates.

10. Arc electrode feeding means comprising a motor having a first field connected in parallel with the gap, an opposing field connected in series with the gap, and an armature coacting with the resultant of said fields, limited as to maximum speed, connected in a circuit the admittance of which is relatively unaffected by variation in speed of said armature over the range of operating speeds of said armature, and arranged to operate the electrodes of said gap to cause relative approachment of said electrodes when said first field predominates and relative recession of said electrodes when said opposing field predominates.

11. Arc electrode feeding means comprising a motor having a first field connected in parallel with the gap, an opposing field connected in series with the gap, and an armature coacting with the resultant of said fields, limited as to maximum speed, connected in a circuit of sufficiently high resistance to substantially eliminate the effect of the armature counter-electro-motive-force, and arranged to operate the electrodes of said gap to cause relative approachment of said electrodes when said first field predominates and relative recession of said electrodes when said opposing field predominates.

12. Arc electrode feeding means comprising a motor having a first field connected in parallel with the gap, an opposing field connected in series with the gap, and an armature coacting with the resultant of said fields, formed so as to be inherently limited as to maximum speed, connected in a circuit the admittance of which is relatively unaffected by variation in speed of said armature over the range of operating speeds of said armature, and arranged to operate the electrodes of said gap to cause relative approachment of said electrodes when said first field predominates and relative recession of said electrodes when said opposing field predominates.

13. Arc electrode feeding means comprising a motor having a first field connected in parallel with the gap, an opposing field connected in series with the gap, and an armature coacting with the resultant of said fields, formed so as to be inherently limited as to maximum speed, connected in a circuit of sufficiently high resistance to substantially eliminate the effect of the armature counter-electro-motive-force, and arranged to operate the electrodes of said gap to cause relative approachment of said electrodes when said first field predominates and relative recession of said electrodes when said opposing field predominates.

14. Arc electrode feeding means comprising a motor having a first field connected in parallel with the gap, an opposing field connected in series with the gap, an armature coacting with the resultant of said fields, connected in a circuit the admittance of which is relatively unaffected by variation in the speed of said armature over the range of operating speeds of said armature, and arranged to operate the electrodes of said gap to cause relative approachment of said electrodes when said first field predominates and relative recession of said electrodes when said opposing field predominates, and means effective to vary the relative strengths of said fields.

15. Arc electrode feeding means comprising a motor having a first field connected in parallel with the gap, an opposing field connected in series with the gap, and an armature coacting with the resultant of said fields, connected in series with said first field and with an external resistor in a circuit which, including the resistance of said armature and of said first field and of said resistor, is of sufficiently high resistance to substantially eliminate the effect of the armature counter-electro-motive-force, and arranged to operate the electrodes of said gap to cause relative approachment of said electrodes when said first field predominates and relative recession of said electrodes when said opposing field predominates, the resistance of said external resistor being variable to thus vary the relative strengths of said fields.

16. Arc electrode feeding means comprising a motor having its field windings connected to cause the motor field to vary responsive to arc conditions from a field in one direction through zero field to a field in the reverse direction, having its armature connected to be continually energized in the same direction to operate in one direction when said field is in one direction to then cause relative approachment of the electrodes and to operate in the reverse direction when said field is in the reverse direction to then cause relative separation of the electrodes, and provided with additional field poles for dissipating the armature field.

17. Arc electrode feeding means comprising a motor having its field windings connected to cause the motor field to vary responsive to arc conditions from a field in one direction through zero field to a field in the reverse direction, having its armature connected to be continually energized in the same direction to operate in one direction when said field is in one direction to then cause relative approachment of the electrodes and to operate in the reverse direction when said field is in the reverse direction to then cause relative separation of the electrodes, and provided with additional field poles alternated with the main poles for dissipating the armature field.

18. Arc electrode feeding means comprising a motor having a first field connected in parallel with the gap, an opposing field connected in series with the gap, and an armature coacting with the resultant of said fields, connected in a circuit the admittance of which is relatively unaffected by variation in speed of said armature over the range of operating speeds of said armature, and arranged to operate the electrodes of said gap to cause relative approachment of said electrodes when said first field predominates and relative recession of said electrodes when said opposing field predominates, said motor being provided also with additional poles for dissipating the armature field.

19. Arc electrode feeding means comprising a motor having a first field connected in parallel with the gap, an opposing field connected in series with the gap, and an armature coacting with the resultant of said fields, connected in a circuit the admittance of which is relatively unaffected by variation in speed of said armature over the range of operating speeds of said armature, and arranged to operate the electrodes of said gap to cause relative approachment of said electrodes when said first field predominates and relative recession of said electrodes when said opposing field predominates, said motor being provided also with additional poles alternated with the main poles for dissipating the armature field.

20. Arc electrode feeding means comprising a motor having a first field connected in parallel with the gap, an opposing field connected in series with the gap, and an armature coacting with the resultant of said fields, connected in a circuit which is of sufficiently high resistance to substantially eliminate the effect of the armature counter-electro-motive-force, and arranged to operate the electrodes of said gap to cause relative approachment of said electrodes when said first field predominates and relative recession of said electrodes when said opposing field predominates, said motor being provided also with additional poles for dissipating the armature field.

21. Arc electrode feeding means comprising a motor having a first field connected in parallel with the gap, an opposing field connected in series with the gap, and an armature coacting with the resultant of said fields, connected in a circuit which is of sufficiently high resistance to substantially eliminate the effect of the armature counter-electro-motive-force, and arranged to operate the electrodes of said gap to cause relative approachment of said electrodes when said first field predominates and relative recession of said electrodes when said opposing field predominates, said motor being provided also with additional poles alternated with the main poles for dissipating the armature field.

In testimony whereof I hereunto affix my signature.

HARRY H. STRONG.